US012609038B2

(12) United States Patent
Farjon et al.

(10) Patent No.: US 12,609,038 B2
(45) Date of Patent: Apr. 21, 2026

(54) DEVICE FOR DETECTING, BY A DRONE, AT LEAST ONE APPROACHING MANNED AIRCRAFT AND ASSOCIATED METHOD FOR DETECTING

(71) Applicant: SAFRAN ELECTRONICS & DEFENSE, Paris (FR)

(72) Inventors: Julien Farjon, Moissy-Cramayel (FR); Vianney Quilici, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 200 days.

(21) Appl. No.: 18/474,474

(22) Filed: Sep. 26, 2023

(65) Prior Publication Data

US 2024/0105068 A1 Mar. 28, 2024

(30) Foreign Application Priority Data

Sep. 28, 2022 (FR) ...................................... 2209575

(51) Int. Cl.

*G08G 5/55* (2025.01)
*G08G 5/25* (2025.01)
*G08G 5/57* (2025.01)
*G08G 5/80* (2025.01)

(52) U.S. Cl.

CPC ................ *G08G 5/55* (2025.01); *G08G 5/25* (2025.01); *G08G 5/57* (2025.01); *G08G 5/80* (2025.01)

(58) Field of Classification Search

None

See application file for complete search history.

(56) References Cited

U.S. PATENT DOCUMENTS

2020/0184836 A1 6/2020 Yang et al.

FOREIGN PATENT DOCUMENTS

WO 2015173033 A1 11/2015

OTHER PUBLICATIONS

Search Report from the French Intellectual Property Office on corresponding FR application (FR2209575) dated Jun. 6, 2023.

*Primary Examiner* — Jason Holloway
*Assistant Examiner* — Christopher A Buksa
(74) *Attorney, Agent, or Firm* — Alumen IP Law PC

(57) ABSTRACT

A device for detecting, by a drone, at least one manned aircraft, the manned aircraft emitting at least one positioning message comprising at least one altitude data, the detection device having a receiver to receive the positioning message and to measure its reception strength, a calculator configured to compare an altitude difference with a first threshold to activate a first state of vigilance in case of exceedance, compare the reception strength with a second threshold to activate a second vigilance state in case of exceedance, and generate at least one collision warning signal if the first vigilance signal and the second vigilance signal are active simultaneously.

8 Claims, 4 Drawing Sheets

DEVICE FOR DETECTING, BY A DRONE, AT LEAST ONE APPROACHING MANNED AIRCRAFT AND ASSOCIATED METHOD FOR DETECTING

TECHNICAL FIELD

The present invention relates to the field of unmanned aircraft, known as drones. The invention relates more particularly to a method for detecting aircraft located in the vicinity of a drone so as to enable them to be avoided, in particular, at altitudes of less than 152 m (approximately 500 feet).

It is known to use a drone for various missions such as capturing images or transporting loads. The presence of drones in the airspace is likely to increase, which increases the risk of collision with manned aircraft.

To reduce the risk of collision, it is known to equip a drone with a video camera to observe the vicinity of the drone. The collected images are then analyzed by an operator or electronically, which theoretically allows any aircraft in the vicinity to be detected. In practice, it is complex to monitor the vicinity of the drone using only images. This is all the more complex as the drone and/or nearby aircraft may move at a substantial speed and/or velocity.

In practice, to ascertain their respective positions, manned aircraft periodically transmit positioning messages following an interrogation of a radar or another manned aircraft. These positioning messages contain, in particular, the altitude of the emitting aircraft and an identifier of said aircraft. This allows manned aircraft to know the relative position of other manned aircraft.

Currently, for safety reasons, a drone is not authorized to interrogate a manned aircraft. Therefore, it is known to equip a drone with an incoming cooperative surveillance system (known as "ADS-B In") configured to listen to the positioning messages sent by the different manned aircraft. This advantageously allows the drone to know if manned aircraft are moving at an altitude close to its own. In fact, altitude data typically comprises inaccuracies that, in spaces with high aircraft density, cause a large number of false alarms, which has a disadvantage. The different manned aircraft transmit positioning messages, known to the person skilled in the art under the designation "Mode S", which only contain the altitude and identifier information of the manned aircraft.

Thus, the invention aims to eliminate at least some of these disadvantages.

SUMMARY

The invention relates to a device for detecting, for a drone, at least one manned aircraft, the manned aircraft transmitting at least one positioning message comprising at least one altitude data item, the drone having a drone altitude; the device for detecting comprising:

At least one receiver configured to receive the positioning message from the manned aircraft, At least one calculator configured to compare an altitude difference, determined between the altitude of the drone and the altitude of the manned aircraft, with a first threshold so as to activate a first state of vigilance in case of exceedance.

The invention is remarkable in that, as the receiver is configured to measure the reception strength of the positioning message received, the calculator is configured to:

Compare the reception strength of the positioning message with a second threshold so as to activate a second state of vigilance in case of exceedance, and If the first vigilance signal and the second vigilance signal are active simultaneously, generate at least one collision warning signal.

Thanks to the invention, the number of false alarms is reduced by using the reception strength of the positioning message. Reception strength is advantageous as it is passively accessible without interrogating the manned aircraft, which complies with IT security requirements. In addition, the reception strength is correlated with the separation distance between the manned aircraft and the drone, which forms a relevant criterion for avoiding a collision.

Preferably, the calculator is configured to filter the reception strength of the positioning message prior to its comparison with the second threshold, preferably with a Kalman filter. This makes it possible to filter the reception strength measurements and improve the relevance of the comparison with the second threshold.

Preferably, the calculator is configured to:

Calculate a derivative of the reception strength of the positioning message between two consecutive time instants, Compare the derivative of the reception strength with a third threshold so as to activate a third state of vigilance in case of exceedance, and If the first vigilance signal, the second vigilance signal and the third vigilance signal are active simultaneously, generate the collision warning signal.

The number of false alarms is further reduced by using the derivative of the reception strength of the positioning message. The derivative of reception strength is advantageous as it allows the variation in the separation distance between the manned aircraft and the drone to be measured indirectly and passively. Thus, knowledge of a rapid reduction in the separation distance is a relevant criterion for avoiding a collision.

Preferably, the calculator is configured to filter the derivative of the reception strength prior to its comparison with the third threshold, preferably, with a Kalman filter. This makes it possible to filter the measurements of the derivative of the reception strength and improve the relevance of the comparison with the third threshold.

According to one aspect, the calculator is configured to:

Count the number of consecutive collision warning signals generated over time,

Emit the collision warning signal if said number of consecutive collision warning signals is greater than or equal to a first predetermined number of occurrences, and Retain the collision warning signal if said number of consecutive collision warning signals is less than the first predetermined number of occurrences.

Thus, a collision warning signal is emitted only after a certain number of occurrences, thereby validating the risk of collision and avoiding emitting false warnings.

According to another aspect, the calculator is configured to:

Determine a percentage of collision warning signals over a given period,

Emit the collision warning signal if the percentage of collision warning signals is greater than or equal to a first predetermined threshold, and Retain the collision warning signal if the percentage of collision warning signals is less than the first predetermined threshold.

According to another aspect, as the calculator is configured to generate at each time instant a collision warning signal or a safety signal, the calculator is configured to:

Count the number of consecutive safety signals generated over time,

Emit a safety signal if said number of consecutive safety signals is greater than or equal to a second predetermined number of occurrences, and Retain the safety signal if said number of consecutive safety signals is less than the second predetermined number of occurrences.

Thus, a safety signal is emitted only after a certain number of occurrences, which makes it possible to lift a warning reliably.

According to another aspect, the calculator is configured to:

Determine a percentage of safety signals over a given period,

Emit the safety signal if the percentage of safety signals is greater than or equal to a second predetermined threshold, and Retain the safety signal if the percentage of safety signals is below the second predetermined threshold.

The invention also relates to a drone comprising a detection device as presented previously.

The invention also relates to a method for detecting, by a drone, at least one manned aircraft, the manned aircraft emitting at least one positioning message comprising at least one altitude data item, the drone having a drone altitude, the detection method comprising steps consisting of:

Receiving the positioning message of the manned aircraft,

Measuring the reception strength of the positioning message received,

Comparing an altitude difference, determined between the drone's altitude and the altitude of the manned aircraft, at a first threshold, Activating a first state of vigilance when the first threshold is exceeded, Comparing the reception strength of the positioning message with a second threshold, Activating a second state of vigilance when the second threshold is exceeded, and If the first vigilance signal and the second vigilance signal are active simultaneously, generating at least one collision warning signal.

Preferably, the method comprises steps consisting of:

Calculating a derivative of the reception strength of the positioning message between two consecutive time instants, Comparing the derivative of the reception strength of the positioning message with a third threshold, Activating a third state of vigilance when the third threshold is exceeded, and If the first vigilance signal, the second vigilance signal and the third vigilance signal are active simultaneously, generating the warning signal.

The invention also relates to a computer program type product, comprising at least one sequence of instructions stored and readable by a processor and which, once read by this processor, causes the steps of the method such as presented previously to be carried out.

The invention also relates to a computer-readable medium comprising the product of the computer program type such as presented previously.

BRIEF DESCRIPTION OF THE DRAWINGS

The invention will be better understood upon reading the following description, given as an example, and in reference to the following figures, given as non-limiting examples, wherein identical references are given to similar objects.

It should be noted that the figures set out the invention in detail in order to implement the invention, said figures may of course be used to better define the invention where applicable.

DETAILED DESCRIPTION

Figure 1:
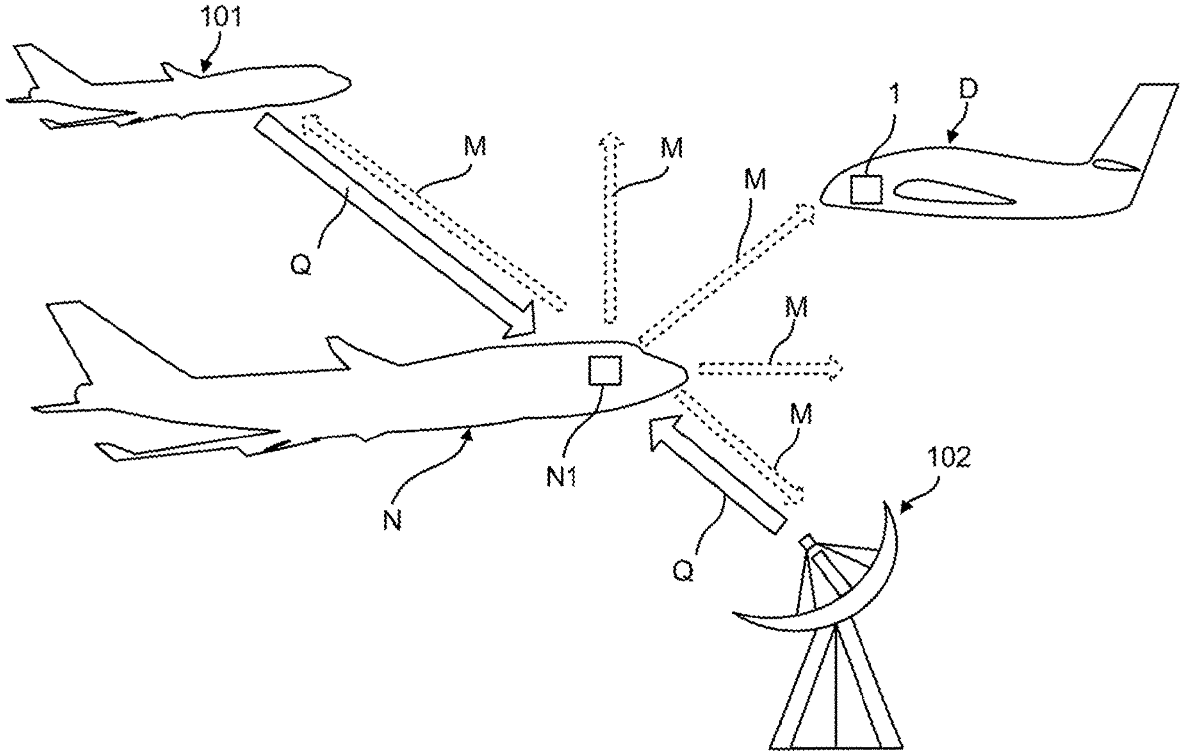
FIG. 1 is a schematic representation of a drone and a manned aircraft emitting a positioning message.

In reference to FIG. 1, a drone D, i.e. an unmanned aircraft, is shown moving in the air. In this example, a drone with a delta wing is shown, but it goes without saying that the invention applies to any type of drone D, in particular, a drone D having a plurality of rotors. The invention relates more particularly to a drone D configured to be controlled beyond the viewing distance by an operator.

Still in reference to FIG. 1, a manned aircraft N is shown, for example a commercial aircraft, moving in the air. In a known manner, as presented in the preamble, a manned aircraft N conventionally comprises a transponder N1 to emit and receive positioning messages M following an interrogation Q of another manned aircraft 101 or a radar center 102.

In a known manner, each positioning message M emitted by the manned aircraft N comprises several pieces of data, of which altitude data ZN at a time instant t and an identifier IDN of the manned aircraft N. In practice, the positioning messages M emitted by the manned aircraft N are broadcast widely and can be received by a drone D without the latter being authorized to interrogate the manned aircraft N.

According to the invention, in reference to FIG. 1, the drone D comprises a detection device 1 to receive and process the positioning messages M emitted by the manned aircraft N located in the vicinity of the drone D.

Figure 2:
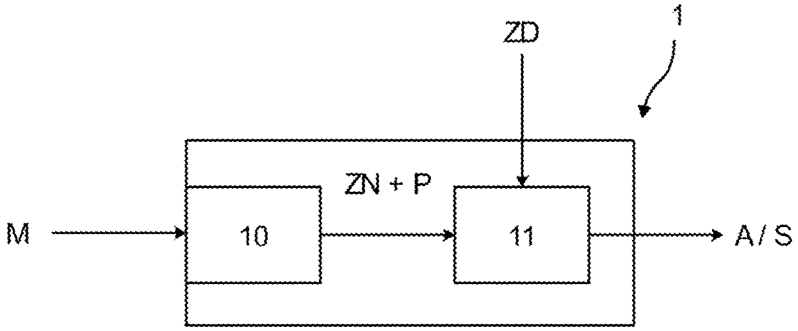
FIG. 2 is a schematic representation of a detection device for a drone according to the invention.

In this example, as shown in FIG. 2, the detection device 1 comprises at least one receiver 10 configured to receive a positioning message M and at least one calculator 11 configured to generate a collision warning signal A according to the positioning message M and an altitude of the drone ZD. Preferably, the altitude of the ZD drone is determined by an altimeter or similar of the drone D. Such an altimeter is known to those skilled in the art and will not be presented in more detail.

The collision warning signal A can have various forms, in particular, a computer message which may be sent to a control station for the pilot of drone N or to a navigation system of drone D so as to adapt the trajectory of the drone D (avoidance maneuver).

The receiver 10 is configured to receive a positioning message M and read the data it contains. Preferably, the receiver 10 is configured to communicate on the frequency of 1090 MHz. The receiver 10 is also configured to measure a reception strength P of the positioning message M that has been received. Preferably, the reception strength P corresponds to an RSSI parameter for "Received Signal Strength Indicator", i.e. the signal-to-noise ratio of the positioning message M.

However, it goes without saying that any parameter that depends on the reception strength P could be used. The calculation of an RSSI parameter is known to those skilled in the art and will not be presented in more detail.

Figure 3:
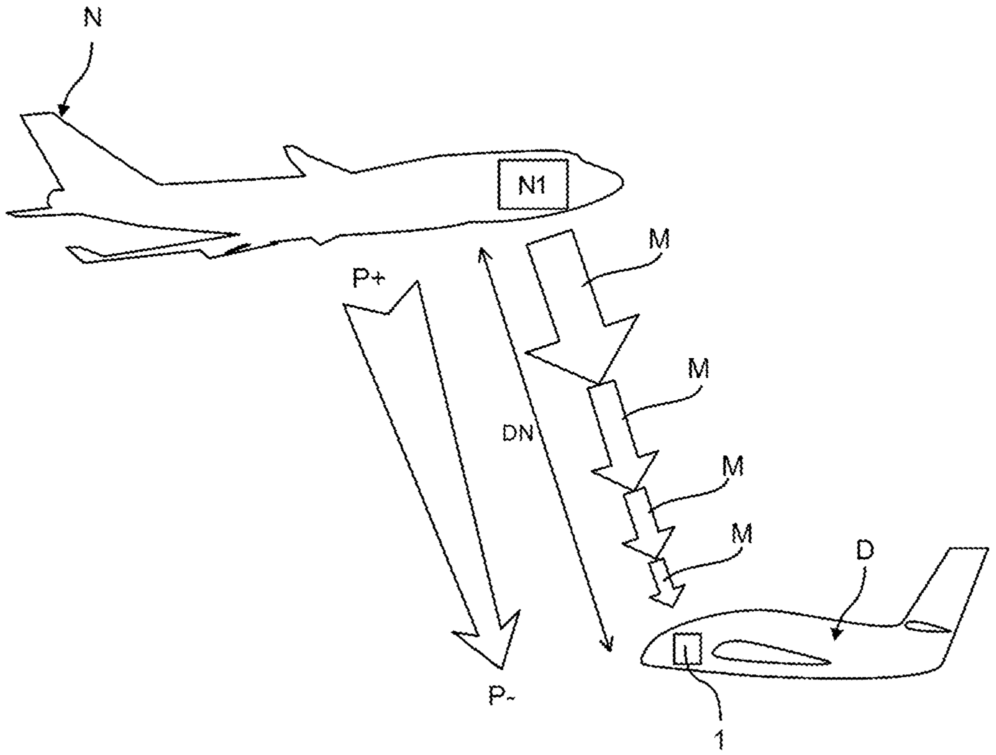
FIG. 3 is a schematic representation of the reception strength of a positioning message emitted by the manned aircraft.

As shown in FIG. 3, when a manned aircraft N emits a positioning message M, the reception strength P depends on the separation distance DN, i.e., the distance between the receiver 10 of the drone D and the transponder N1 of the manned aircraft N. Thus, the further away the drone D is from the manned aircraft N, the lower the reception strength P. In other words, the reception strength P makes it possible to estimate the separation distance DN between the drone D and the manned aircraft N. The present invention aims to take advantage of this correlation to allow the risk of collision to be reduced without interrogating the manned aircraft N and thus respect the requirements in terms of safety.

Preferably, the correlation law between the reception strength P (in particular the parameter RSSI) and the separation distance DN is determined beforehand, preferably statistically.

Figure 4:
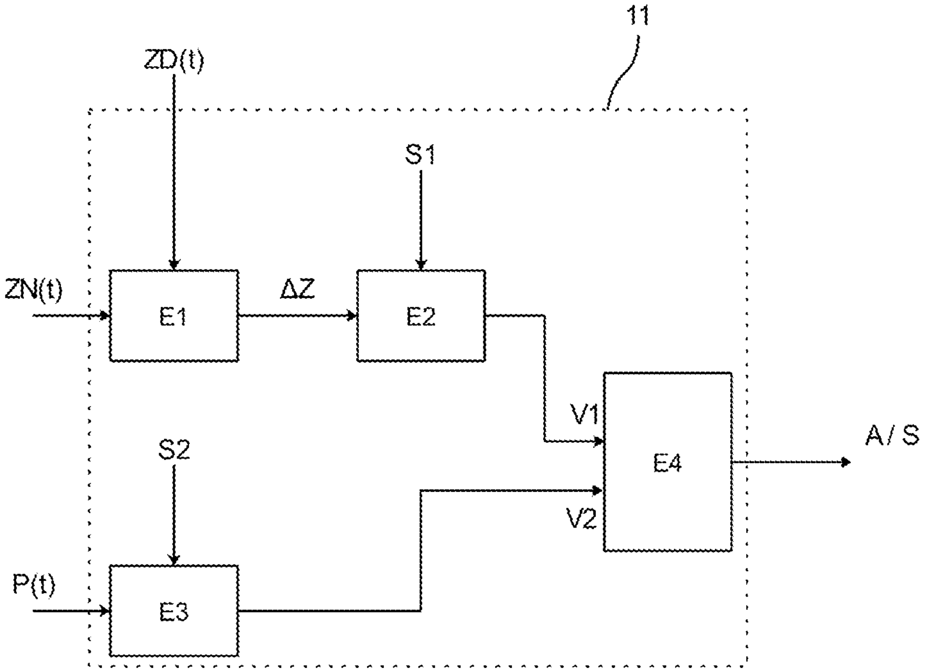
FIG. 4 is a schematic representation of a first embodiment of a detection method according to the invention.

According to the invention, in reference to a first embodiment shown in FIG. 4, the calculator 11 is configured to implement the steps consisting of:

- Determining E1 an altitude difference ΔZ between the altitude of the drone ZD and the altitude of the manned aircraft ZN,
- Comparing E2 the altitude difference ΔZ with a first threshold S1 so as to activate a first state of vigilance V1 in case of exceedance,
- Comparing E3 the reception strength P of the positioning message M with a second threshold S2 so as to activate a second state of vigilance V2 in the event of an exceedance, and
- If the first vigilance signal V1 and the second vigilance signal V2 are active simultaneously, generating E4 at least one collision warning signal A.

Preferably, the calculator 11 comprises a memory (not shown) wherein the first threshold S1 and the second threshold S2 are stored. Preferably, the first threshold S1 and the second threshold S2 correspond respectively to an altitude threshold and to a reception strength threshold. The thresholds S1, S2 are preferably predetermined so as to obtain the desired collision warning level A. Preferably, the thresholds S1, S2 are dynamically adapted according to the conditions, so that the desired collision warning level A is retained in all circumstances.

Preferably, the second threshold S2 is determined according to the minimum horizontal distance accepted between two aircraft during their flight (usually 9300 m) and the correlation law linking the reception strength P and the separation distance DN.

Thus, in a similar way to the prior art, a first state of vigilance V1 is activated if the manned aircraft N has an altitude ZN close to the altitude ZD of the drone D. However, a collision warning signal A is generated only if the reception strength P of the positioning message M is high (activation of the second vigilance signal V2). Indeed, as explained previously, the reception strength P is correlated with the separation distance DN, resulting in a higher risk of collision for neighboring altitudes and for a reduced separation distance DN. The use of the reception strength P of the positioning message M thus substantially reduces the risk of false alarms while allowing for optimum detection.

Preferably, reception strength P is filtered, for example with a Kalman filter, to smooth out the measurements.

Preferably, the collision warning signal A comprises the identifier of the manned aircraft N present in the positioning message M.

Figure 5:
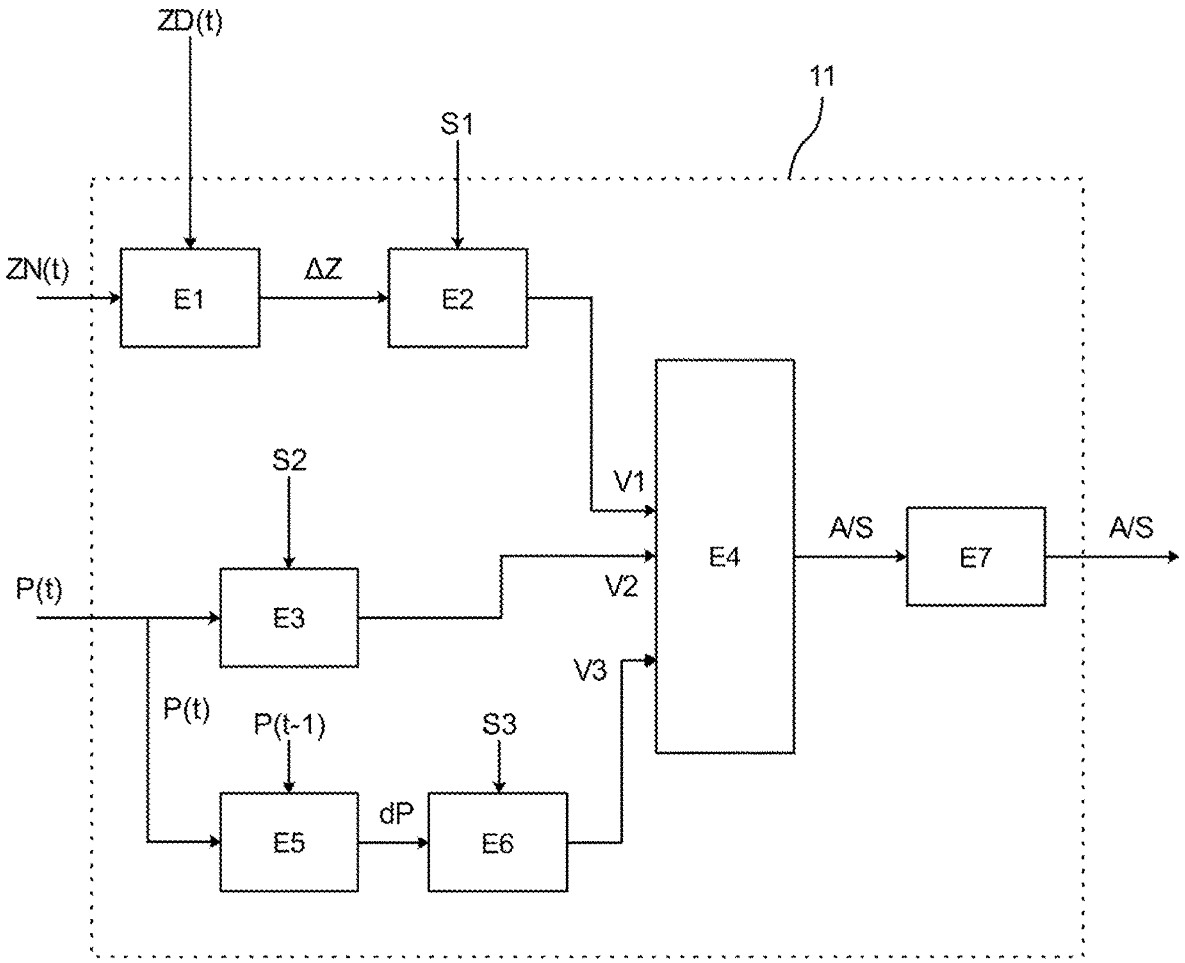
FIG. 5 is a schematic representation of a second example of an embodiment of a detection method according to the invention.

In reference to a second embodiment shown in FIG. 5, the calculator 11 is configured to implement additional steps. For the sake of clarity and brevity, the steps presented for the first embodiment will not be presented again.

The calculator 11 is thus configured to implement the steps consisting of:

- Calculating E5 a derivative dP of the reception strength P of the positioning message M between two consecutive time instants,
- Comparing E6 the derivative of the reception strength dP with a third threshold S3 so as to activate a third vigilance state V3 in case of exceedance,
- If the first vigilance signal V1, the second vigilance signal V2 and the third vigilance signal V3 are active simultaneously, generating E4 the collision warning signal A Preferably, the memory of the calculator 11 stores the reception strengths P(t) measured over time so as to calculate the derivative reception strength dP. Preferably, the third threshold S3 is also stored in the memory. Preferably, the third threshold S3 corresponds to a reception strength variation threshold. The thresholds S1, S2, S3 are preferably predetermined so as to obtain the desired collision warning level A.

In this example, the derivative of the reception strength dP is the difference between two RSSI parameters (P(t−1), P(t)) between two consecutive time instants (t−1, t).

Preferably, the reception strength derivative dP is filtered, for example with a Kalman filter, to smoothen the measurements.

Advantageously, in this second embodiment, the derivative of the reception strength dP, i.e. its rate of variation, makes it possible to verify whether the separation distance DN tends to decrease and the speed at which the latter decreases. Thus, if a manned aircraft N is close in distance to the drone D but is moving away from the latter, the third vigilance signal V3 is not made active. Conversely, if a manned aircraft N is far from the drone D but is quickly approaching it, the third vigilance signal V3 is made active.

Optionally, in reference to FIG. 5, so as to further reduce the number of false alarms, the calculator 11 is configured, during a validation step E7, to:

- Count the number of consecutive collision warning signals A generated over time,
- Emit the collision warning signal A if said number of consecutive warning signals is greater than or equal to a first predetermined number of occurrences,
- Retain the collision warning signal A if the number of consecutive warning signals is less than the first predetermined number of occurrences.

Thus, the collision warning signal A is not transmitted systematically, but rather after a certain number of occurrences. Such a validation of the collision warning signal A makes it possible to reduce the number of false alarms without however affecting the reactivity of the detection device 1.

The collision warning signal A may be generated and emitted directly after it is generated so as to warn an operator or a computer system of a risk of collision with a manned aircraft N.

Alternatively, the calculator 11 is configured in a validation step E7 to:

Determine a percentage of collision warning signals A over a given period (preferably a sliding time window), Emit the collision warning signal A if the percentage of collision warning signals A is greater than or equal to a predetermined first threshold, and Retain the collision warning signal A if the percentage of collision warning signals A is less than the first predetermined threshold.

For example, a collision warning signal A is emitted if the percentage of collision warning signals exceeds a predetermined threshold, for example, 80% of the time over the last 10 seconds.

According to one aspect of the invention, the calculator 11 is configured to generate at every time instant a collision warning signal A or a safety signal S. In reference to FIG. 5, so as to avoid intermittent emission of the collision warning signal, the calculator 11 is configured, during a validation step E7, to:

Count the number of consecutive safety signals S generated over time,

Emit a safety signal S if said number of consecutive safety signals S is greater than or equal to a second predetermined number of occurrences, Retain the safety signal S if said number of consecutive safety signals is less than the second predetermined number of occurrences.

As with collision warning signal A, a safety signal S is not always systematically transmitted, but is transmitted after a certain number of occurrences. Such a validation of the safety signal S makes it possible, by hysteresis, to alternatively emit collision warning signals A and safety warning signals S, which improves the robustness and reliability of the detection system 1.

Alternatively, the calculator 11 is configured in a validation step E7 to:

Determine a percentage of safety signals S over a given period (preferably a sliding time window), Emit the safety signal S if the percentage of safety signals S is greater than or equal to a second predetermined threshold, and Retain the safety signal S if the percentage of safety signals S is below the second predetermined threshold.

For example, a safety signal S is emitted if the percentage of safety signals is greater than a predetermined threshold, for example, 80% of the time over the last 10 seconds.

Alternatively, the validation step E7 may implement a sliding window so as to smooth out the collision warning signals A or safety warning signals S.

Figure 6:
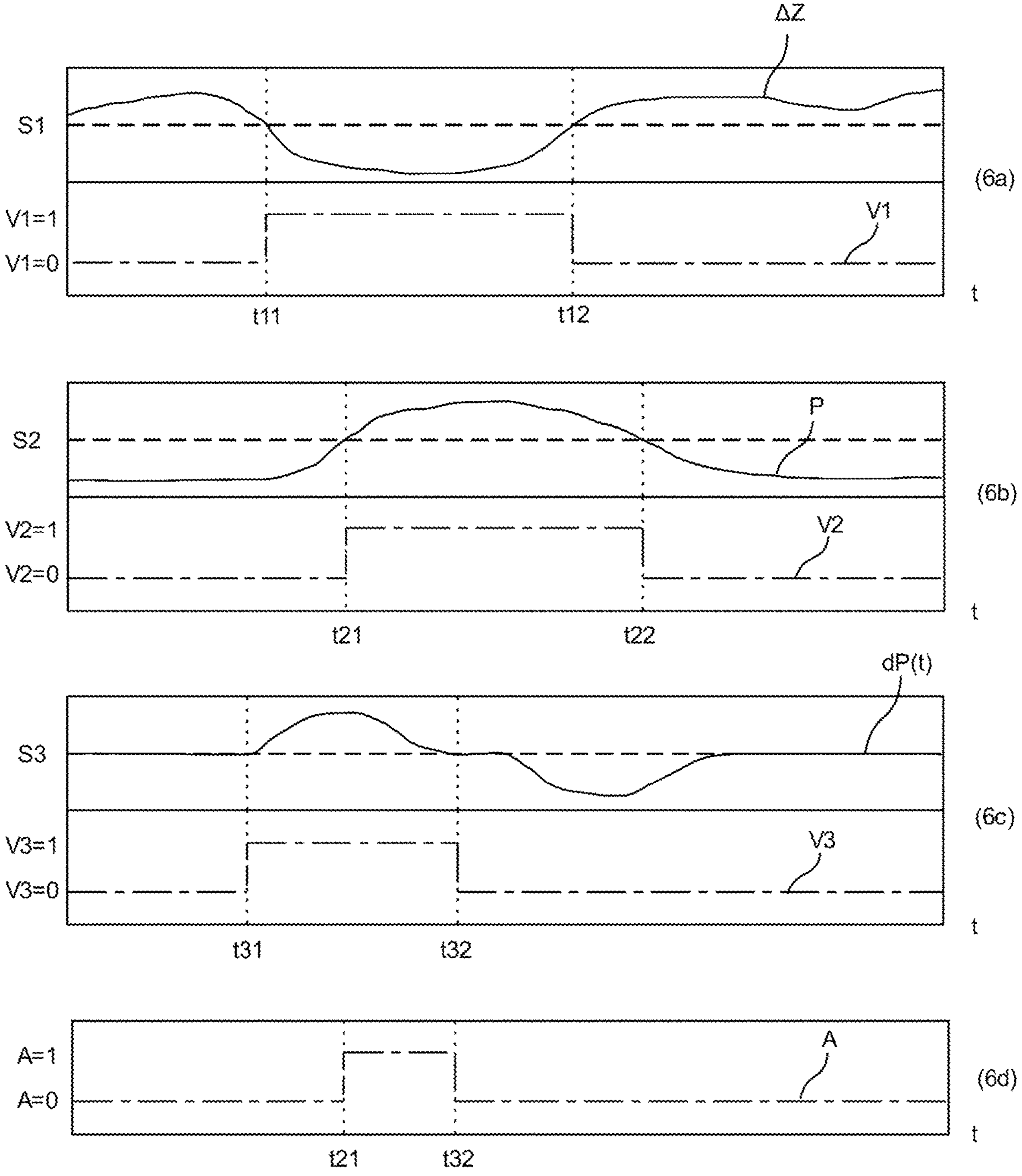
FIG. 6 is a schematic representation of curves of altitude difference, reception strength and the derivative of the reception strength.

An embodiment of a method for detecting according to the invention will now be presented in reference to FIG. 6.

This example will refer to the scenario of the invention shown in FIG. 1. A drone D is hovering at a drone altitude ZD of 1500 m. A manned aircraft N is moving at an altitude ZN lower than that of the drone D. As explained previously, the drone D is not authorized to interrogate the transponder N1 of the manned aircraft N, unlike the other manned aircraft 101 or the radar center 102 which are authorized to do so. Therefore, the drone D receives only the positioning message M passively from the manned aircraft N.

The receiver 10 of the detection device 1 of the drone D receives the positioning message M which comprises at least the altitude ZN as well as its identifier ID. The receiver 10 may thus determine the reception strength P.

As previously explained, in reference to FIG. 6, the calculator 11 may thus determine over time t:

The altitude difference ΔZ (frame 6*a* in FIG. 6) to compare it with the first threshold S1, for example, 300 m;

The reception strength P (frame 6*b* of FIG. 6) to compare it with the second threshold S2;

The derivative of the reception strength dP (frame 6*c* in FIG. 6) to compare it with the third threshold S3.

In reference to the first frame 6*a* of FIG. 6, the altitude difference ΔZ is less than the first threshold S1 between the time instants t11 and t12. Also, between the time instants t11 and t12, the first vigilance signal V1 is active (V1=1) and inactive outside (V1=0). The first vigilance signal V1 is used to warn of the fact that manned aircraft N is flying at a neighboring altitude.

Similarly, in reference to the second frame 6*b* of FIG. 6, the reception strength P is greater than the second threshold S2 between the time points t21 and t22. Also, between the time instants t21 and t22, the second vigilance signal V2 is active (V2=1) and inactive outside (V2=0). The second vigilance signal V2 makes it possible to warn about a separation distance DN with the manned aircraft N.

Similarly again, in reference to the third frame 6*c* of FIG. 6, the derivative of the reception strength dP is greater than the third threshold S3 between the time instants t31 and t32. Also, between the time instants t31 and t32, the third vigilance signal V3 is active (V3=1) and is inactive outside (V3=0). The third vigilance signal V3 makes it possible to warn of a reduction in the separation distance DN over time with the manned aircraft N.

In reference to the fourth frame 6*d* in FIG. 6, the calculator 11 emits a collision warning signal A between the time instants t21 and t32 since the vigilance signals V1, V2, V3 are simultaneously active. This substantially limits the number of false alarms compared to a prior art detection device based only on the altitude difference ΔZ (the collision warning signal A would have been emitted between the time instants t11 and t12). In order to make the detection system robust, a validation step may also be implemented as presented previously.

Thanks to the invention, a reliable collision warning signal A may be emitted so as to alert an operator or a navigation system of the drone D so as to avoid any actual collision. Advantageously, the drone D does not emit interrogation requests to manned aircraft N, which guarantees safety.

The invention claimed is:

1. A detection device, for a drone, of at least one manned aircraft, the manned aircraft emitting at least one positioning message comprising at least one altitude data item, the drone having a drone altitude; the detection device comprising:

at least one receiver configured to receive the positioning message from the manned aircraft, at least one calculator configured to:

compare an altitude difference, determined between the altitude of the drone and the altitude of the manned aircraft, with a first threshold so as to activate a first state of vigilance in case of exceedance, as the receiver is configured to measure the reception strength of the positioning message received, the calculator is configured to:

compare the reception strength of the positioning message with a second threshold so as to activate a second state of vigilance in case of exceedance, calculate a derivative of the reception strength of the positioning message between two consecutive time instants, compare the derivative of the reception strength to a third threshold so as to activate a third state of vigilance in case of exceedance, and if the first vigilance state, the second vigilance state, and the third vigilance state are active simultaneously, generate at least one collision warning signal, else said collision warning signal is not generated.

2. The detection device according to claim 1, wherein the calculator is configured to filter the reception strength of the positioning message prior to its comparison with the second threshold.

3. The detection device according to claim 1, wherein the calculator is configured to filter the derivative of reception strength prior to its comparison with the third threshold.

4. The detection device according to claim 1, wherein the calculator is configured to:

determine a percentage of collision warning signals over a given period, emit the collision warning signal if the percentage of collision warning signals is greater than or equal to a first predetermined threshold, and retain the collision warning signal if the percentage of collision warning signals is less than the first predetermined threshold.

5. The detection device according to claim 1, wherein the calculator being configured to generate at any instant a collision warning signal or a safety signal corresponding to an absence of risk of collision, the calculator is configured to:

determine a percentage of safety signals over a given period, emit the safety signal if the percentage of safety signals is greater than or equal to a second predetermined threshold, and retain the safety signal if the percentage of safety signals is below the second predetermined threshold.

6. A drone comprising a detection device according to claim 1.

7. A method for detecting, by a drone, at least one manned aircraft, the manned aircraft emitting at least one positioning message comprising at least one altitude data item, the drone having a drone altitude, the detection method comprising steps consisting of:

receiving the positioning message from the manned aircraft, measuring the reception strength of the received positioning message, comparing an altitude difference, determined between the altitude of the drone and the altitude of the manned aircraft, with a first threshold, activating a first state of vigilance when the first threshold is exceeded, comparing the reception strength of the positioning message with a second threshold, activating a second state of vigilance when the second threshold is exceeded, calculating a derivative of the reception strength of the positioning message between two consecutive time instants, comparing the derivative of the reception strength to a third threshold so as to activate a third state of vigilance in case of exceedance, and if the first vigilance state, the second vigilance state, and the third vigilance state are active simultaneously, generating at least one collision warning signal, else said collision warning signal is not generated.

8. A non-transitory computer-readable medium, comprising at least one sequence of instructions stored and readable by a processor and which, once read by this processor, causes the steps of the method according to claim 7 to be carried out.

* * * * *